US012433572B2

(12) United States Patent
Joseph

(10) Patent No.: US 12,433,572 B2
(45) Date of Patent: Oct. 7, 2025

(54) IMAGING SYSTEM WITH A TILT-ADJUSTABLE SECONDARY DISPLAY

(71) Applicant: KONINKLIJKE PHILIPS N.V., Eindhoven (NL)

(72) Inventor: Raju Joseph, Bangalore (IN)

(73) Assignee: KONINKLIJKE PHILIPS N.V., Eindhoven (NL)

(*) Notice: Subject to any disclaimer, the term of this patent is extended or adjusted under 35 U.S.C. 154(b) by 185 days.

(21) Appl. No.: 17/632,408

(22) PCT Filed: Aug. 12, 2020

(86) PCT No.: PCT/EP2020/072621
§ 371 (c)(1),
(2) Date: Feb. 2, 2022

(87) PCT Pub. No.: WO2021/028470
PCT Pub. Date: Feb. 18, 2021

(65) Prior Publication Data
US 2022/0287681 A1 Sep. 15, 2022

Related U.S. Application Data

(60) Provisional application No. 62/887,003, filed on Aug. 15, 2019.

(51) Int. Cl.
A61B 8/00 (2006.01)
F16M 11/10 (2006.01)

(52) U.S. Cl.
CPC ............ A61B 8/462 (2013.01); A61B 8/4427 (2013.01); A61B 8/4488 (2013.01); A61B 8/467 (2013.01); F16M 11/10 (2013.01); F16M 2200/024 (2013.01)

(58) Field of Classification Search
CPC ..... A61B 8/462; A61B 8/4427; A61B 8/4488; A61B 8/467; F16M 11/10; F16M 2200/024
See application file for complete search history.

(56) References Cited

U.S. PATENT DOCUMENTS

| 5,520,361 A * | 5/1996 | Lee ......................... H04N 5/655 248/398 |
| 6,443,896 B1 | 9/2002 | Detmer |
| 6,530,885 B1 | 3/2003 | Entrekin et al. |

(Continued)

OTHER PUBLICATIONS

International Search Report and Written Opinion for PCT/EP2020/072621; Mailing date: Nov. 12, 2020, 10 pages.

Primary Examiner — Dixomara Vargas

(57) ABSTRACT

An ultrasound imaging system includes a display panel that is pivotally coupled to a control panel such that the display panel is adjustable to a plurality of incline or tilt angles. A tilt adjustment mechanism may be coupled to the display panel to more firmly hold the display panel in an inclined position. The tilt adjustment mechanism may include a first arm pivotally coupled to the display panel and having a plurality of teeth, and a second arm configured to selectively engage the first arm to position and hold the display panel in an inclined position. The second arm may be slidably coupled to the display panel such that it remains attached to the display panel during adjustments of the tilt angle.

20 Claims, 8 Drawing Sheets

(56) References Cited

U.S. PATENT DOCUMENTS

| | | | |
|---|---|---|---|
| 2004/0150628 A1* | 8/2004 | Huang | G06F 1/1628 |
| | | | 345/173 |
| 2006/0007645 A1* | 1/2006 | Chen | G06F 3/0202 |
| | | | 361/679.04 |
| 2007/0030410 A1* | 2/2007 | Cheng | F16M 11/10 |
| | | | 349/58 |
| 2010/0053876 A1* | 3/2010 | Widmer | G06F 1/166 |
| | | | 361/679.55 |
| 2013/0197364 A1 | 8/2013 | Han | |
| 2014/0352125 A1* | 12/2014 | Duran | F16M 11/10 |
| | | | 361/679.56 |
| 2014/0355374 A1* | 12/2014 | Huang | G01S 7/52079 |
| | | | 248/351 |
| 2015/0025386 A1* | 1/2015 | Ninomiya | A61B 8/54 |
| | | | 600/443 |
| 2015/0038841 A1* | 2/2015 | Ichimura | G06F 1/1681 |
| | | | 600/437 |
| 2016/0109058 A1* | 4/2016 | Bennett | F16M 11/2014 |
| | | | 248/278.1 |
| 2016/0120507 A1 | 5/2016 | Ninomiya et al. | |
| 2016/0345935 A1* | 12/2016 | Woo | A61B 8/462 |
| 2019/0212785 A1* | 7/2019 | Choi | F16M 11/10 |

* cited by examiner

IMAGING SYSTEM WITH A TILT-ADJUSTABLE SECONDARY DISPLAY

CROSS-REFERENCE TO PRIOR APPLICATIONS

This application is the U.S. National Phase application under 35 U.S.C. § 371 of International Application No. PCT/EP2020/072621, filed on Aug. 12, 2020, which claims the benefit of e.g. U.S. Provisional Patent Application No. 62/887,003, filed on Aug. 15, 2019. These applications are hereby incorporated by reference herein.

BACKGROUND

The present disclosure relates generally to medical imaging systems such as ultrasound imaging systems. Ultrasound imaging systems typically include a user interface, which operates in conjunction with a display to provide medical images from signals transmitted and received via a transducer array, typically provided in a probe. Often the user interface includes one or more manual controls. In addition, modern ultrasound imaging systems frequently include a touch-sensitive display as a way of displaying secondary menus and controls to the user or clinician during a patient exam. The user interface (e.g., soft user controls) on the touch-sensitive display may be automatically re-configurable by the ultrasound system depending on the specific application or imaging protocol active at a given time. However, touch control panels in commercially available systems may have shortcomings, in particular, relating to ergonomics and usability. Therefore, improvements of touch control panels of ultrasound systems may be desirable.

SUMMARY

An ultrasound imaging system that is operable to generate ultrasound images from ultrasound echoes acquired by a transducer array may include, among other things, a control panel and a display panel pivotally coupled to the control panel. The display panel may include a touch-sensitive display on its user-facing side and may thus provide a graphical user interface that can be easily (e.g., automatically by the system) and frequently (e.g., when switching between types or exams or imaging protocols or function) re-configurable for a particular application. The display panel may be one of a plurality of display panels, such as a secondary display panel which is in addition to a main display panel typically present in existing ultrasound systems and which typically serves as the main display for images. The display panel may be pivotally coupled to the control panel and configured to be firmly held at any inclined position using a tilt-adjustment mechanism or. For example, the system may be provided with a first arm pivotally coupled to the display panel such that the first arm is pivotable about the touch screen. The first arm may be arranged on the opposite side of the user-facing side, i.e., the rear side, of the display panel and may include a plurality of teeth that face away from the user-facing side of the display panel. The system may also include a second arm, which is pivotally coupled to the control panel and configured to selectively engage the plurality of teeth to support the display panel in any one of a plurality of inclined positions.

In various embodiments of the imaging system, the display panel and the first arm may be pivotable about a common axis. In some embodiments, the display panel may be pivotally coupled to the control panel using a friction hinge. In some embodiments, the display panel may be biased toward the control panel and more specifically toward the stowed position of the display panel. In some embodiments, the second arm may include a pawl at its end opposite the arm pivot, which is configured to mesh between the teeth of the first arm to selectively engage the first arm. In yet further examples, the first arm may be biased towards the second arm. In some embodiments the first arm may be pivotally coupled to the display panel at one end and a second opposite end of the first arm may be wrapped over at least a portion of an edge of the display panel to position the second end relatively closer to the user-facing side than the first end. In some such embodiments, the second end of the first arm may include a traction feature to facilitate manipulation of the first arm by the user for pivoting of the first arm and disengage the pawl from the teeth. In some embodiments, the second end may wrap over an edge (e.g., the upper edge) of the display panel and the traction feature may include a ledge extending away from the upper edge of the display panel. The ledge may be implemented using any structure suitable shaped and located for the application of user force for pivoting the first arm. In some embodiments, the plurality of teeth of the first arm may each have a leading side that faces the first end of the first arm and a trailing side that faces the second end of the first arm, wherein the trailing sides of the teeth are arranged at a shallower incline than the leading sides to permit the pawl of the second arm to move or advance along the first arm toward the first end of the first arm without manually pivoting the first arm to disengage the pawl. In other words, in such examples, the first and second arms may be configured such that adjustments to the tilt angle may be made in one direction (e.g., to increase the tilt angle toward the upright or 90 degree position) without manually pivoting the first arm. Adjustments to the tilt angle in the opposite direction (e.g., towards the stowed position) without manually pivoting the first arm (e.g., to unlock the tilt-adjustment mechanism by disengaging the second arm from the first arm) may be resisted or essentially prevented by the configuration of the first and second arms, e.g., by the relatively more steeply oriented leading sides of the teeth).

In some embodiments, the tilt-adjustment mechanism may include a guide. The guide may provide part of a slidable joint between the upper (e.g., pawl) end of the second arm and the rear side of the display panel such that the second arm remains attached, albeit movably, at all times, e.g., during tilt adjustments to the display panel and even when the display panel is in the stowed position. The guide may include one or more structures fixed to the display panel, and the second arm may be movably (e.g., slidably) coupled to the guide such that the second arm remains coupled to the display panel while the inclined position of the display panel is changed. In some specific examples, the guide may include one or a pair of slots, which may be oriented along the length of the first arm. That is, the length of the slots may be generally aligned (e.g., parallel) to the length of the first arm. In some specific examples, a pair of slots may be used, which may be disposed along opposite longitudinal sides of the toothed portion of the first arm. In some embodiments, the second arm may be provided, e.g., at its upper end near the pawl, with one or more pins extending transversely (i.e., transverse to the length-wise direction) from opposite sides of the second arm. The pins of the second arm may be slidably received within a respective one of the pair of slots of the guide so as to slidably couple the second arm to the display panel, e.g., to the rear side of the display panel.

In some embodiments, the control panel may be configured to accommodate the secondary display panel such that it is substantially flush with the control panel when stowed. For example, the control panel may include or define a cavity that can receive the display panel, in some cases substantially fully, therein. In some embodiments, the second arm may be positioned between the first arm and a base of the cavity when the display panel is provided in a stowed position in which the display panel lies substantially flat within the cavity. As noted above, the ultrasound imaging system may, in some examples include a primary or main display which is separate from the touch-sensitive display. The main display, which may be a passive (i.e. non touch-sensitive) display, may be movably coupled to the control panel, for example using an articulating arm. In other examples, the ultrasound system may be a portable system, which includes first and second housing portions each housing the components of the main display and control panel, respectively, and which are hinged together in a note-book type form factor. In some such examples, the secondary display panel, when in stowed, may be positioned within a cavity of the second or control panel portion such that it does not inhibit or interfere with the closing of the first portion over the second portion.

BRIEF DESCRIPTION THE DRAWINGS

DETAILED DESCRIPTION

Certain details are set forth below to provide a sufficient understanding of the present disclosure. However, it will be clear to one skilled in the art that embodiments of the invention may be practiced without various of these particular details. Moreover, one or more aspects of the embodiments herein may not be shown to scale in the figures but may be exaggerated for purposes of illustration of the principles of the present invention.

Various embodiments will be described more fully hereinafter with reference to the accompanying drawings. In explanations of the various embodiments, the same or corresponding elements may be denoted by the same reference designators. For the sake of brevity and to avoid duplicate explanation, descriptions to the same elements as set forth in one embodiment may be omitted or only briefly mentioned in each succeeding embodiment.

Figure 1:
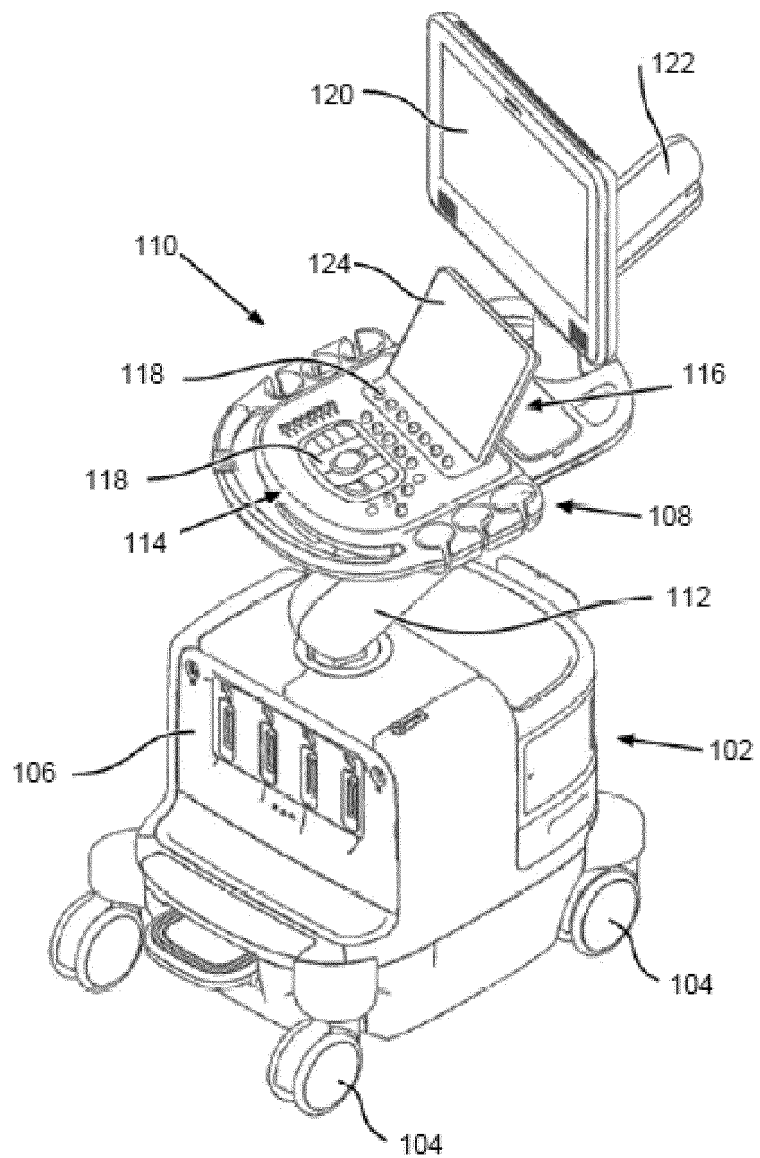
FIG. 1 illustrates a cart-based ultrasound imaging system in accordance with some examples of the present disclosure.
Figure 2A:
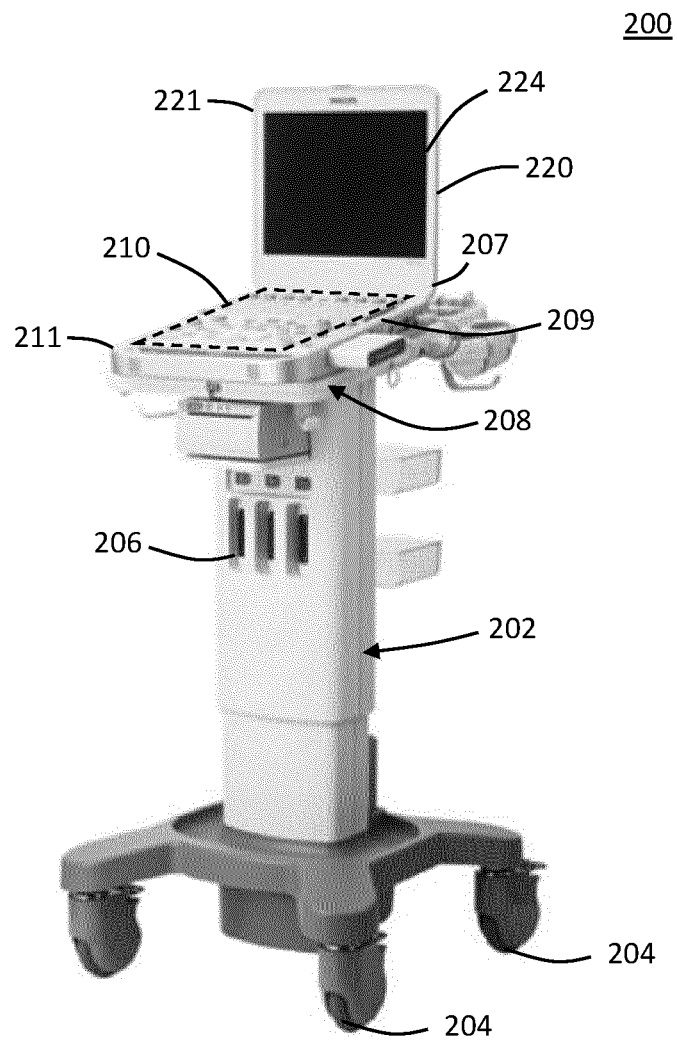
FIGS. 2A-2B illustrate an ultrasound imaging system in accordance with further examples of the present disclosure.
Figure 2B:
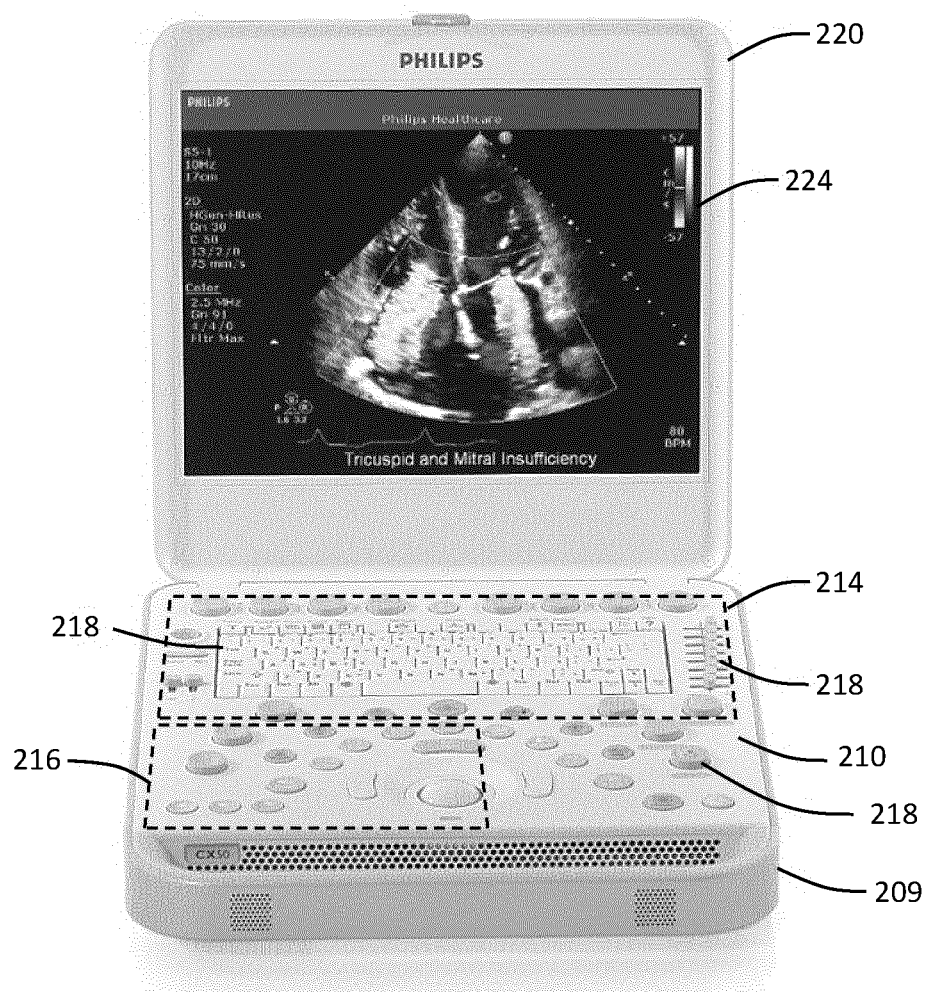

FIG. 1 illustrates an example of an ultrasound imaging system 100, which may include a tilt-adjustable display in accordance with some embodiments of the present disclosure. The ultrasound imaging system 100 may be used to generate ultrasound images from ultrasound echoes acquired by a transducer array. The ultrasound imaging system 100 may include suitable signal and image processing components (e.g., as described further with reference to FIG. 7) for the generation and display of ultrasound images. The signal and image processing components may be incorporated into a cart-based system (e.g., as shown in FIG. 1) or into a portable ultrasound system such as a tablet ultrasound system or a notebook-type ultrasound system, e.g., as shown in FIG. 2A and FIG. 2B. The ultrasound imaging system may include a touch-sensitive display which may provide a touch screen interface in accordance with the principles of the present invention.

FIG. 1 shows an example of a cart-based ultrasound imaging system, which may include a tilt-adjustable display according to the present disclosure. The ultrasound imaging system 100 in FIG. 1 includes a base 102 (e.g., a cart). The base 102 may include casters or wheels 104 that facilitate movement of the ultrasound imaging system from one location to another, such as between patient and exam rooms, labs, or surgical rooms. One or more of the electronic components of the ultrasound imaging system 100, such as one or more processors, controllers, signal generators/receivers, and/or input and output (I/O) devices 106 may be provided in the base 102. One or more ultrasound transducer probes (not shown) may be coupled to the base 102, typically removably, for example via an I/O device 106 or wirelessly.

The ultrasound imaging system 100 may include a control platform 108, which supports a control panel 110. The control platform 108 may be adjustably connected to the base 102, e.g., via a first articulating arm 112, which enables the position of the control platform 108 relative to the base 102 to be changed. The control panel 110 may include a first control panel 114, which may include a plurality of manual controls 118 implemented as any of a variety of physical or mechanical input devices, such as one or more dials, buttons, knobs, switches, keyboards, trackballs, or the like. The control panel 110 may also include a touch control panel 116 which may provide additional controls, and which may thus be referred to as a secondary control panel 116. Touch control panel 116 which may be implemented by a touch-sensitive display 124 built using any currently known or later developed touch sensitive display technologies (e.g., resistive, capacitive, pressure-sensitive capacity, infrared, etc.). In accordance with the principles of the present disclosure, the touch control panel 116 may be movably coupled relative to the first control panel 114, for example pivotally coupled to the first control panel 114, such as to enable adjusting a tilt angle of the secondary control panel 116. The user interface (e.g., the set of graphical user interface control elements provided on the secondary control panel 116), may be reconfigurable, typically automatically by the imaging system 100, based on the specific imaging mode or application that is active at any given time on the system. As such, the main physical controls of the ultrasound imaging system 100 may be easily supplemented with a large number of additional user control functions, tailored for a particular application. Despite the versatility of touch-sensitive controls, manual controls may still be desirable, for example because of operator familiarity with such controls and also because manual controls provide a tactile feedback (e.g., a physical change in position), which may enable the operator to perform certain functions without having to look at the controls. However, embodiments that include only a touch-sensitive controls (e.g., as one or a plurality of control panels of a control panel assembly) are envisioned and are within the scope of the present disclosure. In some embodiments, one or more of the controls (e.g., manual controls) may, alternatively or additionally, be provided on the transducer probe. In some embodiments, only touch screen interface(s) may be used for controlling the operation of the ultrasound imaging system 100.

In some embodiments, the control panel 110, or a portion thereof, may be irremovably attached to (i.e. integrated into) the control platform 108. For example, some or all of the control panel 110 may be integrated into the control platform 108. In other embodiments, the control panel 110, or a portion thereof, as well as certain functionality of the ultrasound system may be incorporated into a portable unit, which may be separable from the base 102. In such embodiments, the ultrasound imaging system 100 may include a docking structure, provided on or proximate the control platform 108 to allow the portable unit to be removably attached and operatively (e.g., electrically) coupled to the base 102. In some embodiments, the system 100 may include an additional monitor 120 separate from the touch-sensitive display 124. In some examples, the monitor 120 may be referred to as a main display panel or simply main display. The monitor 120 may be adjustably connected to the base 102 and/or control platform 108, for example, via a second articulating arm 122. In some embodiments, the monitor 120 may be a passive display (e.g., may not include touch-sensitive portions) and may be used to display images acquired with the ultrasound imaging system 100 or another imaging system. In some embodiments, images, graphic overlays including patient information or relevant clinical measurements or other data. In some embodiments monitor 120 may display replicas or variations of data displayed on any of the touch touch-sensitive display 124.

FIGS. 2A-2B illustrate an example of a portable ultrasound imaging system 200 which may be provided with a tilt-adjustable display in accordance with embodiments of the present disclosure. In FIG. 2A, the portable ultrasound imaging system 200 is shown supported on a movable base 202, which may position and support the controls and display(s) of the system 200 at a more suitable (e.g., ergonomic) position for the user. FIG. 2B shows the ultrasound imaging system 200 in isolation (i.e., without the base 202). The portable ultrasound imaging system 200 may include some or all of the components of ultrasound imaging system 710 described further below with reference to FIG. 7. For example, the portable ultrasound imaging system 200 may include all of the electronic components necessary for acquiring and displaying ultrasound images.

In this embodiment, the portable ultrasound imaging system 200 includes a first portion 220, which includes the main display 224 and thus also referred to as display portion 220, and a second portion 209, which includes at least one control panel (e.g., the primary control panel 210) and is thus also referred to as control panel portion 209. The display portion 220 and the control panel portion 209 are foldably (e.g., hingedly) coupled to one another such that the ultrasound imaging system 200 can be provided in a more compact (e.g., a folded) configuration in which the main display 224 is folded toward and faces the control panel 210.

The ultrasound imaging system 200 can be configured to mechanically and/or electronically connect to the movable base 202, and in some such embodiments, certain functionality such as additional storage and/or additional input/output device may be provided by base 202. The portable ultrasound imaging system 200 may be mechanically coupled to or supported by the base such as by simply resting the ultrasound imaging system 200 on the support platform 208, and in some cases optionally against one or more arresting ledges, while in other examples, the ultrasound imaging system 200 may be coupled by being additionally mechanically locked or otherwise secured to the movable base 202. When ultrasound imaging system 200 is secured to the movable base 202, system 200 is essentially reconfigured into a cart-based system. The movable base 202 may include casters or wheels, such as wheels 204, which facilitate movement of the ultrasound imaging system from one location to another, as between patient and exam rooms, labs, or surgical rooms. In some embodiments, the ultrasound imaging system 200 may additionally or alternatively be electronically coupled (via wired or wireless connection) to the movable base 202. In some such embodiments, one or more of the electronic components of the ultrasound imaging system, such as one or more processors, controllers, signal generators/receivers, and/or input and output (I/O) devices 206 may be provided in the base 202 (as shown in FIG. 2A) or in the control panel portion 209. Movable base 202 may be rendered a stationary base by removal of the wheels 204.

All of the signal and image processing components essential to ultrasound data acquisition and image generation may be located in the portable system (e.g., the ultrasound imaging system 200) while any electronic components in the movable base 202 may provide auxiliary functionality (e.g., additional storage, additional and/or processing, additional peripherals and/or input and output devices, etc.) In some embodiments, the movable base 202 may include a docking structure provided on or proximate the support platform 208 to allow the portable system 200 to be removably attached and operatively (e.g., electrically) coupled to the movable base 202. The movable base 202 may also include one or more support structures for supporting or securing one or more ultrasound transducer probes, e.g., while not in use for imaging. In some embodiments, the ultrasound probes may be removably coupled to the ultrasound imaging system 200, the base 202, or both.

As shown in FIG. 2B, the display portion 220 and the control panel portion 209 may both be provided in an integrated housing having a portable (e.g., capable of being easily carried by a single person) form factor. For example, the display portion 220 and the control panel portion 209 may be provided in first and second housing portions 221 and 211, respectively, which are pivotally connected to one another by a pivot or hinge joint, to form a portable notebook-style imaging system. In other embodiments, components of the control panel portion (e.g., the control panel 210 or components thereof) may be provided alongside the main display 224. In some embodiments, the main display 224 may be a passive display (e.g., may not include any touch-sensitive portions) and may be used primarily for the display of information (e.g., images or measurements) acquired with the ultrasound system 200 or another imaging system. In other embodiments, the main display may include at least one touch sensitive portion, which may be provided alternative to or in addition to any other touch-sensitive control interfaces (e.g., a secondary control panel) of the imaging system 200.

In accordance with the principles of the present disclosure, the control panel portion 209 of an existing portable ultrasound system such as the CX50 ultrasound system sold by PHILIPS, may be modified to include a touch control panel 216 (e.g., a touch screen) alongside a manual control panel 214, which may include the manual controls 218 of the system, such as one or more dials, buttons, knobs, switches, keyboards, trackballs, or the like. The touch control panel 216 may be located on a same side of the hinge joint and may itself be pivotally connected to the underlying structure in accordance with the principles of the present disclosure. In this manner, the touch control panel 216 may be adjustable from the stowed position, in which the touch control panel 216 is substantially flush with the main control panel, to various tilt angles, as will be described further below. The touch control panel 216 may provide a secondary display and/or a second reconfigurable (e.g., by the system) portion of the control panel of the system, and may thus also be referred to as secondary control panel or secondary display. The tilt-adjustable touch control panel 216 (also referred to as a secondary control panel 216) may be located at any suitable location on the control panel portion 209, such as below, above, or to one side of the keyboard. In some embodiment, secondary control panel 216 may replace some, a subset, or all of the manual controls (e.g., the keyboard, touch pad, trackball, the time gain compensation (TGC) sliders, the gain knob or any other one or combination of knobs or sliders of a conventional control panel) and any remaining manual controls of the primary control panel 210 may be rearranged on the control panel portion 209 to accommodate the secondary control panel 216. In some embodiments, images, graphic overlays including patient information or relevant clinical measurements or other data may be displayed on any of the main display 224, the touch-sensitive display of the touch control panel 216 or both.

Touch displays are becoming prevalent in ultrasound imaging systems partly due to their re-configurability for different use cases/imaging modes. However, in existing ultrasound systems, any such touch displays are typically in a fixed orientation with respect to the control panel, with the typical orientations being either flat in tablet-style ultrasound systems or raised/inclined at a fixed angle in cart-based systems. Neither of these two configurations may be ideal from an ergonomic standpoint, the inventors having envisioned and herein described a solution that may address one or more of the challenges associated with providing a tilt-adjustable control panel on a medical imaging system such as an ultrasound system. A tilt-adjustable touch display according to the present disclosure may reduce or prevent glare associated with conventional touch displays and thus improve the readability/visibility of such a display, enable ergonomic adjustments to the display by enabling the angle of the display to be varied to accommodate different user sizes or positions (e.g., seated or standing) thereby potentially reducing repetitive use injuries and generally improving the user experience.

Figure 3:
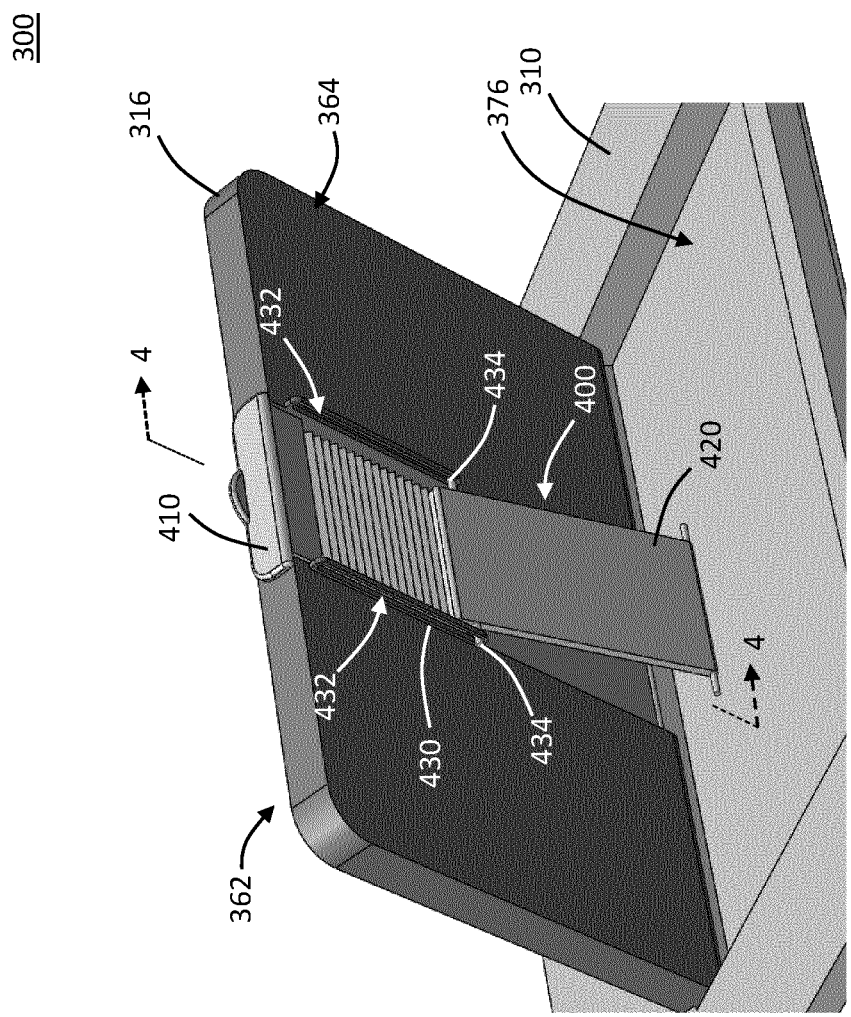
FIG. 3 illustrates a tilt-adjustable display of an ultrasound imaging system in accordance with some examples of the present disclosure.
Figure 4:
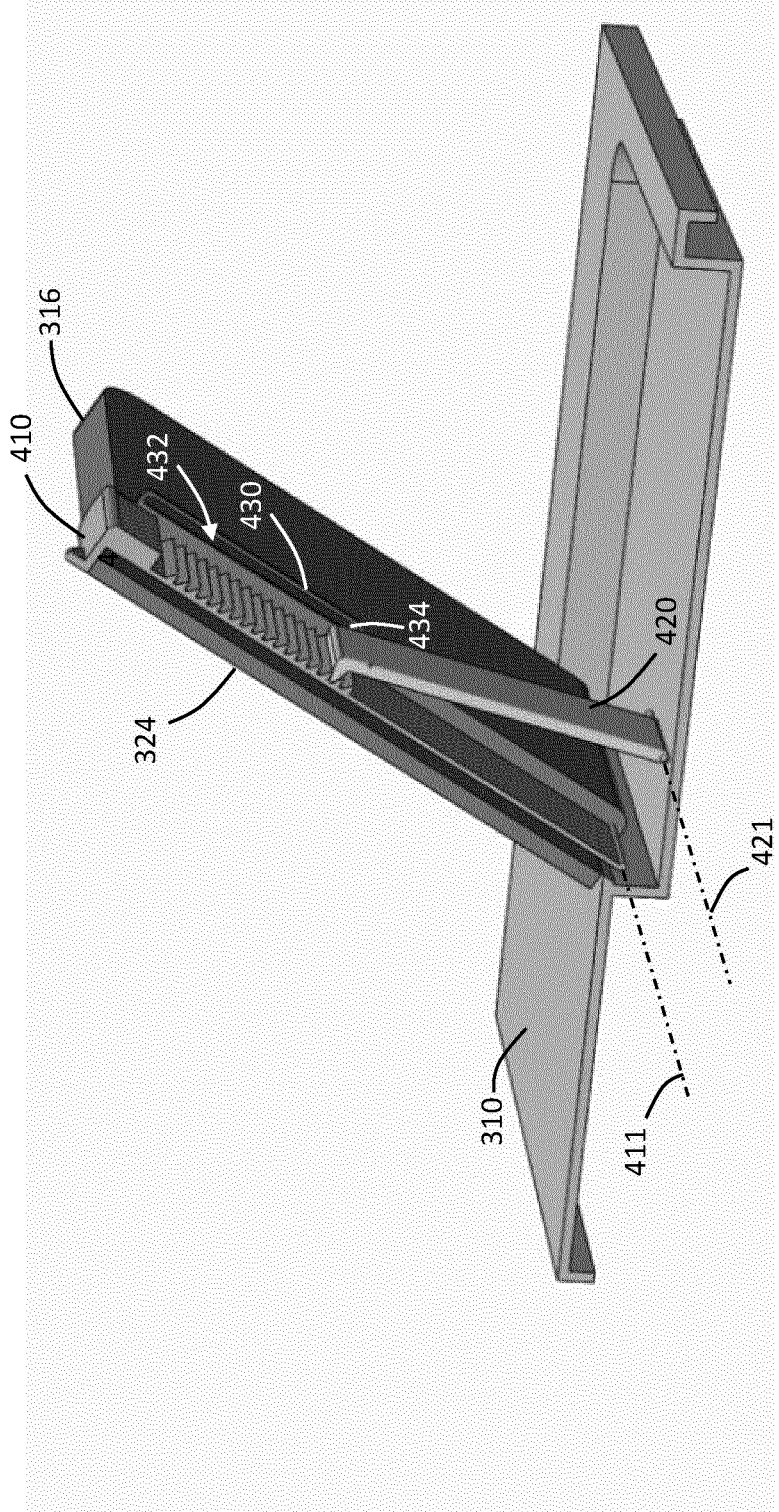
FIG. 4 illustrates a cross-sectional view of the tilt-adjustable display of the ultrasound imaging system of FIG. 3.
Figure 5:
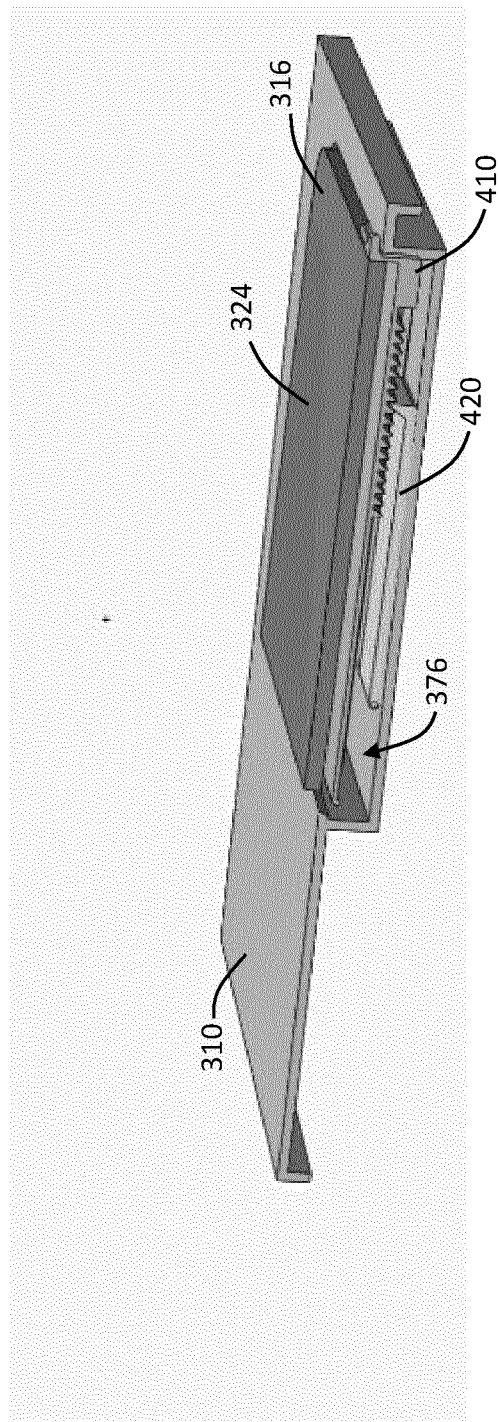
FIG. 5 illustrates another cross-sectional view of the tilt-adjustable display in FIG. 4, shown here in a stowed position.
Figure 6:
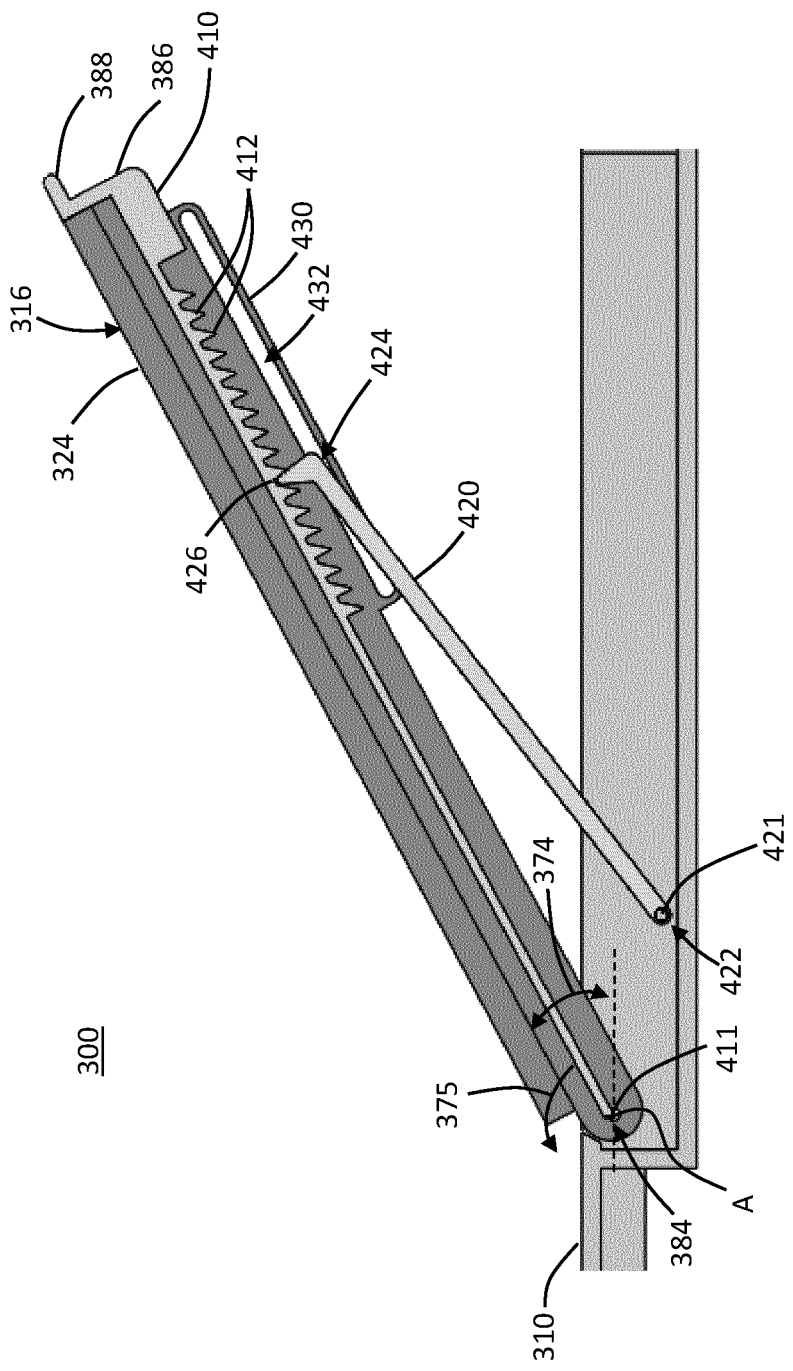
FIG. 6 illustrates yet another cross-sectional view of the tilt-adjustable display of the ultrasound imaging system of FIG. 3.

FIGS. 3-6 illustrate an example of a tilt-adjustable display assembly 300, which can be used to implement a secondary display/control panel (e.g., panels 124 or 216) of an ultrasound imaging system according to the present disclosure. FIG. 3 shows an isometric view of an example display assembly 300, and FIGS. 4-6 show cross-sectional views of the display assembly 300 in which the display panel 316 is shown in different positions (e.g., at different tilt angles) to illustrate principles of the present invention.

The tilt-adjustable display assembly 300 includes a display panel 316 pivotally coupled to supporting structure, shown here as a portion of a control panel 310. The display panel 316 includes a touch-sensitive display unit or touch screen 324 that may provide a re-configurable user interface to the ultrasound imaging system. As described, the touch screen 324 may be reconfigured by the system to display different user interface elements at different times during use, such as for different imaging modes or clinical applications. The touch screen 324 is located on a user-facing side 362 of the display panel 316. The display panel 316, and thus the touch screen 324, are pivotally coupled to a control panel 310 of the ultrasound machine such that the display panel 316, and thus the touch screen 324, can be pivoted between a stowed position, as shown in FIG. 5, in which the touch screen 324 lies substantially parallel to and faces upward or away from the control panel 310, and a plurality of inclined positions, including the inclined position shown in FIG. 4, in which the touch screen 324 is at an angle to the control panel 310.

The display panel 316 is pivotally coupled to supporting structure (e.g., control panel 310) via a tilt-adjustment mechanism 400 configured to position and firmly support the display panel 316 at any one of a plurality of inclined positions. The tilt-adjustment mechanism 400 includes a first arm 410 provided on the rear side 364 of the display panel 316 opposite the user-facing side 362. The tilt-adjustment mechanism 400 also includes a second arm 420 pivotally coupled to the supporting structure (e.g., control panel 310). The second arm 420 is configured to engage the first arm 410 to firmly support the display panel 316 in an inclined position as described further below.

As shown in FIG. 6, the display panel 316 may be configured to pivot about tilt axis A whereby the angle of inclination 374 of the display panel 316 with respect to the control panel 310, also referred to as tilt angle, may be varied. The first arm 410 may be carried on the pivoting display panel 316 such that the first arm 410 moves with the display panel 316 when the display panel 316 is adjusted (i.e., pivoted) to different position (i.e., a different tilt angle). Additionally and independently, for engaging and disengaging with the second arm 420, the first arm 410 may be pivotable in relation to the touch screen 324 about a first arm axis 411 (as shown by motion arrow 375). In some examples, the first arm axis 411 may coincide with the tilt axis A, as illustrated in FIG. 6. In other words, the display panel 316 and the first arm 410 may have a common hinge line. In other examples, the display panel 316 and the first arm 410 may pivot about different axes, for example the first arm 410 may pivot about an axis passing through the display panel 316 (e.g., near the lower end of the display panel) but spaced apart from the axis A. The first arm 410 includes a plurality of teeth 412, which in the present example are arranged to face away from the rear side 364 of the display panel 316.

The second arm 420 is pivotally supported on the control panel 310 and includes a free end (upper end 424) configured to operatively engage the teeth 412. The first and second arms 410, 420, and more specifically the teeth 412 and upper end 424 may be configured to allow relatively unimpeded pivotal movement of the display panel 316 in one direction (i.e. the direction of increasing the tilt angle 374) while resisting pivotal movement of the display panel 316 in the opposite direction (i.e. the direction of decreasing tilt angle 374). In some embodiments, a friction hinge may additionally and optionally be provided, as part of the tilt-adjustment mechanism 400 at the pivotal joint between the display panel 316 and the control panel 310, which may increase the pivotal stiffness and thus improve the stability of the pivotal joint (e.g., by the added resistance of the friction hinge further reducing or eliminating spring-back, free-play or any other undesirable movement at the pivotal joint).

As further shown in FIG. 6, the second arm 420 is pivotally coupled, at its lower end 422, to the control panel 310 such that, in use, the second arm 420 pivots about a second arm axis 421, which is spaced apart from the first arm axis 411. The second arm axis 421 in this example does not pass through the display panel 316. The second arm axis 421 is spaced apart from the first axis 411 by a distance selected to effect the desired range of motion (e.g., a tilt angle range) of the display panel 316.

The tilt adjustment mechanism 400 may be configured such that the first and second arms 410 and 420, respectively, remain coupled, although not necessarily engaged, at all times. For example, the upper end 424 of the second arm 420 may be movably (e.g., slidably) coupled to the rear side 364 of the display panel 316. A guide 430, shown here as a pair of slots 432, may be provided on the rear side 364 of the display panel 316 and configured to slidably receive or capture a cooperating structure of the second arm 420. The slots 432 may be fixed to the rear side 364 for example by being formed in an elongate structure projecting (e.g., perpendicularly) from the rear side 364 of the display panel. The slots 432, which may be through slots or blind slots, may be arranged to face one another. That is the apertures of the slots that receive the cooperating structures are arranged on the respective sides of the projects that face one another. In this example, the cooperating structures are provided by a pair of pins 434 each extending transversely to the length-wise direction of the second arm 420.

As shown in FIG. 3 for example, the slots 434 extend in opposite directions from the upper end 424 of the second arm 420 such that each of the pins 434 is received in a respectively one of the slots 432. In use, as the tilt angle of the display panel 316 is adjusted, the pins 434 remain within their respective slot 432 as the upper end 424 moves in relation to the toothed portion of the first arm 410. Other suitable arrangements may be used for movably (e.g., slidably) coupling the upper end 424 to the display panel. For example, the slots 432 of the guide 430 may be formed in a surface of the rear side and the cooperating structure may be arranged to extend toward the rear side (e.g., substantially perpendicular to the rear side). In other examples, one or more rails or tracks and rollers or other suitable sliding structures may be used rather than the pin in slot arrangement of the present example. Also, while the pin and slot arrangement here is shown to include a pair of slots and corresponding pints, in other examples, a different number of cooperating structures (e.g., a single slot and pin arrangement or more than two slot and pin couplings) may be used. In further examples, the location of the slot(s) and pin(s) may be reversed, e.g., with the receiving structure (e.g., slot) provided on the arm 420 and the sliding structure (e.g., pin) provided on the display panel 316. The length of the guide slots 432, the length of the arm 420, and/or the spacing between the arm axes 411 and 412 may be tailored to achieve a desired range of motion, e.g., to limit the forward pivotal movement, and thus the tilt angle, of the display panel 316 up to about 90 degrees and in some cases to less than 90 degrees, for example to 75 degrees, or 60 degrees, or other suitable maximum inclined angle. The second arm 420 may be sized and formed of any suitable rigid material (e.g., metal, plastic, composite, or combinations thereof) capable of supporting the weight of the display panel 316 in a tilted position. The arm 420 may be designed to be sufficiently stiff to prevent any significant (e.g., perceivable by the user) movement of the display when the display is used, e.g., tapped or otherwise touched such as for selecting or operating GUIs on the display.

The first arm 410 may be biased (e.g., via any suitable spring such as a coil spring, a leaf spring, or another suitable biasing member) toward the second arm 420 whereby the teeth 412 are biased toward engagement with the upper end 424 of the second arm 420. As illustrated, the upper end 424 may be configured to operatively engage the teeth 412. For example, the upper end 424 may be shaped or include any suitable structure (e.g., one or more hooks or pawls 426) that extends toward the rear side 364 and thus toward the teeth 412 so as to engage (e.g., be received between adjacent) teeth 412. The shaped upper end 424 of the present example includes a single hook or pawl 426, which is sized to engage (e.g., be received between or mesh between) the teeth 412 to mechanically resist movement of the second arm 420 relative to the first arm 410. Each of the teeth 412 may have a leading side that faces toward the lower end 384 of the arm 410, and a trailing side that faces toward the upper end 386 of the arm 410, with the trailing sides being more shallowly inclined to the length-wise direction of the arm 410 than the leading side, whereby the teeth 412 and pawl 426 operate, in effect, as a ratchet. In other words, advancement of the pawl 426 toward the lower end 384 (that is, up the leading sides of the teeth 412) is resisted to a lesser degree than advancement in the opposite direction, that is up the trailing sides of the teeth 412 toward the upper end 386 of the arm 410. In preferred embodiments, the incline of the trailing sides may be sufficiently steep (e.g., substantially perpendicular to the length-wise direction of the arm 410) such that the latter is essentially prevented without disengagement of the pawl 426 from the teeth 412. In contrast the incline of the leading sides may be sufficiently shallow (e.g., less than 90 degrees, in some cases around 60, 50, or 45 degrees, to the length-wise direction of the arm 410) to allow the pawl to advance toward the lower end 384 without pivoting the arm 410. As such, the tilt angle of the display panel 316 may be increased without pivoting the arm 410 but reducing the tilt angle (such as to lower the display panel) may require actuating the first arm 410.

In some embodiments, the first arm 410 may be provided with an actuation member, which may be coupled to or integrally formed with the upper end 386 of the arm 410. For example, the upper end 386 may be wrapped around so that it extends over a peripheral edge 322 of the display 316 to position the upper end 386, referred here also as actuation end, at a location easily accessible to the user for manipulating the tilt-adjustable mechanism (e.g., for temporarily disengaging the second arm from the teeth 412 when adjusting the tilt angle of the display 316). Alternatively or Additionally, the upper end 386 may be provided with one or more traction features to make it easier for the user to manipulate (e.g., pivot) the first arm 410. For example, a ledge extending from the upper end 386 of the arm may act as the traction features. Additionally or alternatively, the upper end of the arm may be provided with (e.g., coated on or bonded to the upper end) one or more materials that have higher coefficient of static friction than other portions of the first arm. For example, the first arm may be substantially made from a suitable plastic component such as nylon, polyvinyl chloride or other rigid plastic material, while a higher friction material, such as rubber, may be applied to at least a portion of the upper end to provide the traction feature. In some cases, the traction feature may be a combination such as a structural enhancement such as a protrusion and a frictional enhancement such as a rubber coating.

The actuation member 386 may be provided by any suitable structure configured to be gripped by the user for applying a levering force for pivoting the upper end 336 of the toothed arm 330. For example, the actuation member 386 may include a ledge 388 extending beyond a top surface 358 at an upper end 383 of the display panel 316 to provide a convenient place for the user to grip and actuate the toothed arm 330. In some embodiments, the cavity 376 of the control panel 310 may be sized such that there is a gap between the display panel 316 and the end of the cavity 376 such that the user can reach below the ledge 388 to grip and actuate the toothed arm 330. In some embodiments, the display panel 316 may be flush with or below the top surface 378 of the control panel 310 while the ledge 388 is above the top surface 378 to provide the user with a convenient place to grip and actuate the toothed arm 330. In some embodiments, the actuation member 386 may include a texture (e.g., bumps, ridges) to resist slipping of the user's grip. In some embodiments, the actuation member 386 may include a non-slip coating to facilitate the user's grip.

When the pawl 426 is operatively engaged with teeth 412 (e.g., seated between two adjacent teeth 412), downward rotation (i.e., toward the stowed position) of the display panel 316 is resisted or prevented thereby firmly securing the display panel 316 at an inclined position. The first arm 410 may be provided with a sufficient number of teeth 412, suitably arranged along a portion of the length of the arm 410 to effect any desired number of incremental tilt adjustments, for example 3, 4, or 5 increments, or greater number of increments of adjustment (e.g., up to 10, up to 12, or up to 15 different adjustments). In some embodiments, a plurality of different tilt angles may be enabled from zero degrees (i.e., at the stowed position) up to about 60 degrees of incline. In some examples, a tilt angle increment of about 5 degrees, or of about 7 degrees, or other suitable increment, may be used. The number of adjustment increments provided on an imaging system may vary based on the size of the secondary control panel. For example, a larger secondary control panel such as on a cart-based system may have a greater number of incrementally-adjustable tilt angles (e.g., up to 10 available tilt angles), while a smaller secondary control panel such as on a portable (e.g., notebook or other hand-held imaging system) may have a smaller number of available tilt angle, e.g., up to 6 or 7 tilt angles. As will be appreciated in view of the present disclosure, the ability to adjust the tilt angle 374 of the secondary, touch-sensitive control panel, may improve readability of information shown on the secondary display (e.g., by reducing glare from overhead lighting and/or adjusting the angle for a more optimal orientation to the user) and improve ergonomics for a larger demographic of users, such as by enabling users of different sizes to comfortably and conveniently operate the secondary control panel both when seated, when standing and at any of the different positions in which the main control panel may be moved to with respect to the operator.

In some embodiments, the supporting structure (e.g., control panel 310) may define a cavity 376 configured to receive the display panel 316 at least partially, and in some cases substantially fully, therein such as to enable the touch screen 324 to be substantially flush with the upper surface of the control panel 310 when the display panel 316 is in the stowed position. This may be particularly advantageous for storage of the imaging system, for example when placing the main display over the control panel (e.g., when folding closed a note-book style imaging system). When provided in the stowed position, the first and second arms 410 and 420, respectively, may be located substantially between the display panel 316 and the bottom of the cavity 376 and thus be substantially fully enclosed within in the cavity 376, e.g., as shown in FIG. 5.

As previously described, in use, the first arm 410 pivots relative to the touch screen 324 for engaging and disengaging with the second arm 420. In the example in FIG. 6, when actuated for disengaging the second arm 420, the first arm 410 pivots relative to the touch screen 324 about the same axis A whereby an upper end 386 of the arm 410 is brought closer to the touch screen 324. In some embodiments, the upper end 386 of the arm 410 may be configured for manipulation by the user. For example, the upper end 386 may be provided with a ledge 384 or other suitable structure. The ledge 384 may enable the user to more easily grasp and manipulate (e.g., apply a moment to) the arm 410 to cause it to pivot about the axis A toward the user-facing side 362, which action disengages the first arm 410 from the second arm 420 by pulling the toothed portion of the arm 410 away from the pawl 426 of arm 420 allowing the tilt of the display panel 316 to be adjusted. While holding the arm 410 in this pivoted position the user may manipulate the display panel toward a different (e.g., lower angle of inclination) position, and subsequently release the arm 410 to allow it to re-engage the arm 420. Once re-engaged, the interlocking between the pawl end of arm 420 and teeth 412 of arm 410, which are urged towards the pawl end by the biasing element, may substantially reduce or prevent pivotal movement of the display panel until the tilt-adjustment mechanism is once again manipulated by the user (e.g., arm 410 pivoted forward to disengage from the arm 420).

Figure 7:
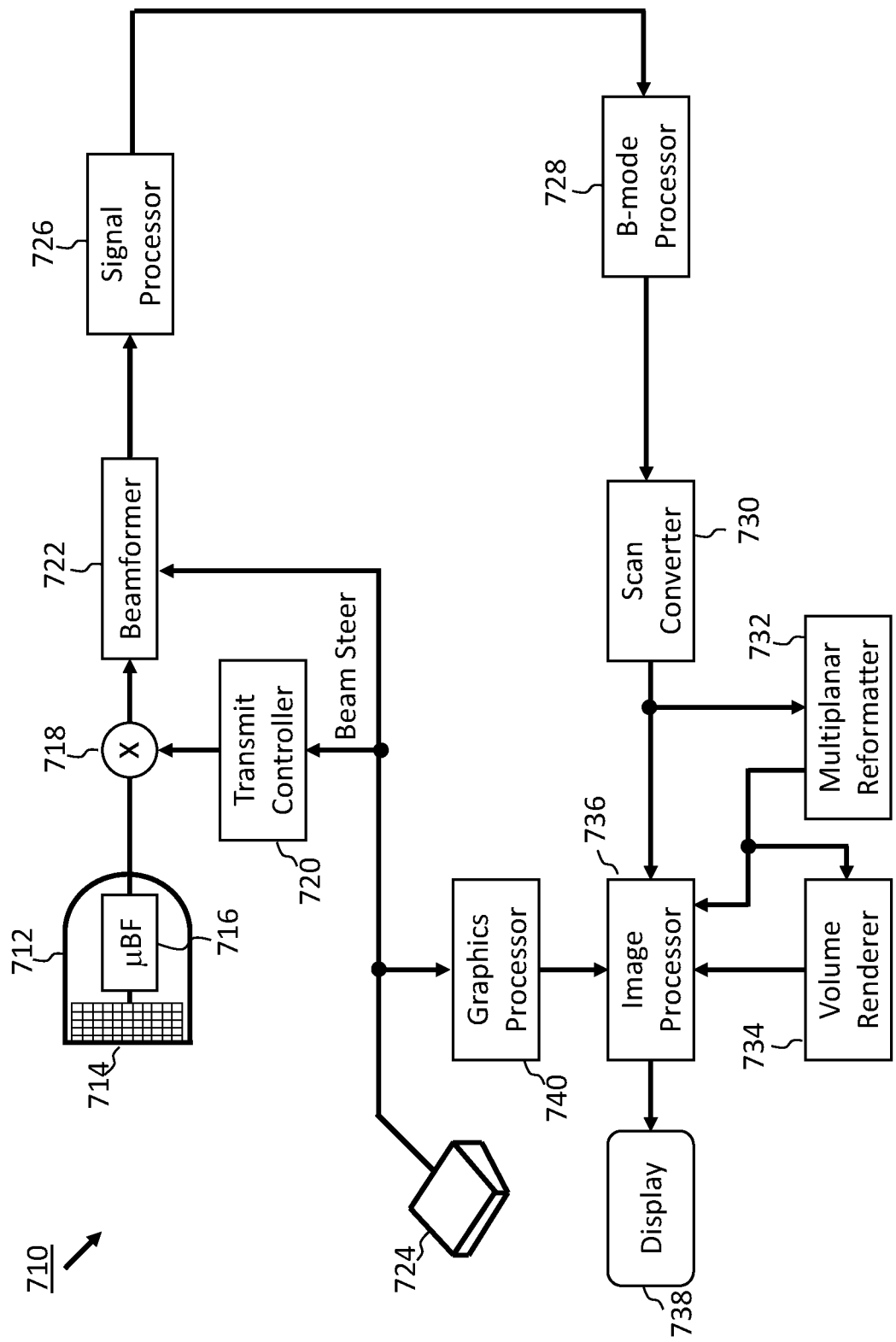
FIG. 7 illustrates a block diagram of an ultrasound imaging system which may include a tilt-adjustable display in accordance with some examples of the present disclosure.

An ultrasound imaging system according to the present disclosure, which may include a tilt-adjustable secondary display, such as the display assembly 300 described above, may include various electronic components for acquiring and displaying ultrasound image data, e.g., as shown in FIG. 7. For example, as shown in FIG. 7, the ultrasound imaging system 710 may include or be configured to be removably coupled to an ultrasound probe 712 that houses a transducer array 714 for transmitting ultrasonic waves and receiving echo information. A variety of transducer arrays are well known in the art, e.g., linear arrays, convex arrays or phased arrays. The transducer array 714, for example, can include a two dimensional array (as shown) of transducer elements capable of scanning in both elevation and azimuth dimensions for 2D and/or 3D imaging. The transducer array 714 is coupled to a microbeamformer 716 in the probe 712 which controls transmission and reception of signals by the transducer elements in the array. In this example, the microbeamformer is coupled by the probe cable to a transmit/receive (T/R) switch 718, which switches between transmission and reception and protects the main beamformer 722 from high energy transmit signals. In some embodiments, the T/R switch 718 and other elements in the system can be included in the transducer probe rather than in a separate ultrasound system base. The transmission of ultrasonic beams from the transducer array 714 under control of the microbeamformer 716 is directed by the transmit controller 720 coupled to the T/R switch 718 and the beamformer 722, which receives input from the user's operation of the user interface or control panel 724. One of the functions controlled by the transmit controller 720 is the direction in which beams are steered. Beams may be steered straight ahead from (orthogonal to) the transducer array, or at different angles for a wider field of view. The partially beamformed signals produced by the microbeamformer 716 are coupled to a main beamformer 722 where partially beamformed signals from individual patches of transducer elements are combined into a fully beamformed signal.

The beamformed signals are coupled to a signal processor 726. The signal processor 726 can process the received echo signals in various ways, such as bandpass filtering, decimation, I and Q component separation, and harmonic signal separation. The signal processor 726 may also perform additional signal enhancement such as speckle reduction, signal compounding, and noise elimination. The processed signals are coupled to a B mode processor 728, which can employ amplitude detection for the imaging of structures in the body. The signals produced by the B mode processor are coupled to a scan converter 730 and a multiplanar reformatter 732. The scan converter 730 arranges the echo signals in the spatial relationship from which they were received in a desired image format. For instance, the scan converter 730 may arrange the echo signal into a two dimensional (2D) sector-shaped format, or a pyramidal three dimensional (3D) image. The multiplanar reformatter 732 can convert echoes which are received from points in a common plane in a volumetric region of the body into an ultrasonic image of that plane, as described in U.S. Pat. No. 6,443,896 (Detmer). A volume renderer 734 converts the echo signals of a 3D data set into a projected 3D image as viewed from a given reference point, e.g., as described in U.S. Pat. No. 6,530,885 (Entrekin et al.) The 2D or 3D images are coupled from the scan converter 730, multiplanar reformatter 732, and volume renderer 734 to an image processor 736 for further enhancement, buffering and temporary storage for display on an image display 738. In some embodiments, one or more of the images generated by image processor may additionally alternatively be displayed on a secondary display panel pivotally coupled to a control panel 724. Such secondary display panel may be implemented and coupled to the control panel 724 in accordance with any of the examples herein. A graphics processor 740 may generate graphic overlays for display with the ultrasound images. These graphic overlays can contain, e.g., standard identifying information such as patient name, date and time of the image, imaging parameters, and the like. The graphics processor, and other functions of the ultrasound system, may receive input from a user interface, which may be implemented using manual (e.g., mechanical) controls and soft (e.g., GUI) controls. As noted above, the user interface may also be operatively coupled to control various other functions of the system, such as the selection of image planes generated by the multiplanar reformatter 732, the selection or setting of various acoustic parameters, etc.

The inventor has thus recognized that a tilt adjustable display for an ultrasound system according to the present disclosure may address one or more of the problems of the current state of the art. For example, the inventor has recognized that a rigid-arm based tilt-adjustment assembly of the kind described herein, in some cases in combination with a friction hinge at the display pivot joint, may provide an improved solution for tilt-adjustable displays by reducing spring-back and free play of the pivot joint, both of which can degrade the user's experience, and may generally ruggedize a tilt-adjustable display assembly, which can increase the useful life of the system.

Although the present system may have been described with particular reference to an ultrasound imaging system, it is also envisioned that the present system can be extended to other medical imaging systems where one or more images are obtained in a systematic manner, such as X-ray, CT, MRI, etc. Finally, the above-discussion is intended to be merely illustrative of the present system and should not be construed as limiting the appended claims to any particular embodiment or group of embodiments. Thus, while the present system has been described in particular detail with reference to exemplary embodiments, it should also be appreciated that numerous modifications and alternative embodiments may be devised by those having ordinary skill in the art without departing from the broader and intended spirit and scope of the present system as set forth in the claims that follow. Accordingly, the specification and drawings are to be regarded in an illustrative manner and are not intended to limit the scope of the appended claims.

What is claimed is:

1. An imaging system comprising:
a control panel;
a display panel pivotally joined to the control panel at a first location on the control panel, wherein the display panel comprises a touch-sensitive display on a user-facing side of the display panel;
a first arm pivotally coupled to the display panel such that the first arm is pivotable about the touch screen, the first arm comprising a plurality of teeth with points facing opposite the user- facing side;
a second arm pivotally joined to the control panel at a second location on the control panel different from the first location, the second arm configured to selectively engage the plurality of teeth to support the display panel in any one of a plurality of inclined positions.

2. The imaging system of claim 1, wherein the display panel and the first arm are pivotable about a common axis.

3. The imaging system of claim 1, wherein the display panel is pivotally coupled to the control panel using a friction hinge.

4. The imaging system of claim 1, wherein the display panel is biased toward the control panel.

5. The imaging system of claim 1, wherein the second arm comprises a pawl configured to mesh between the teeth to selectively engage the first arm.

6. The imaging system of claim 1, wherein the first arm is biased towards the second arm.

7. The imaging system of claim 1, wherein the first arm is pivotally coupled to the display panel at one end and wherein a second opposite end of the first arm is wrapped over at least a portion of an edge of the display panel to position the second end relatively closer to the user-facing side than the first end.

8. The imaging system of claim 7, wherein the second end of the first arm comprises a traction feature to facilitate pivoting of the first arm.

9. The imaging system of claim 8, wherein the second end wraps over the upper edge of the display panel and wherein the traction feature comprises a ledge extending away from the upper edge of the display panel.

10. The imaging system of claim 7, wherein the plurality of teeth each have a leading side that faces the first end of the first arm and a trailing side that faces the second end of the first arm, wherein the second arm comprises a pawl configured to mesh between the plurality of teeth, and wherein the trailing sides are arranged at a shallower incline than the leading sides to permit the pawl to move toward the first end of the first arm without manually pivoting the first arm.

11. The imaging system of claim 1, further comprising a guide fixed to the display panel, wherein the second arm is movably coupled to the guide such that the second arm remains coupled to the display panel while the inclined position of the display panel is changed.

12. The imaging system of claim 11, wherein the guide comprises a pair of slots oriented along a length of the first arm.

13. The imaging system of claim 12, wherein the second arm comprises one or more pins extending transversely from opposite sides of the second arm, and wherein the pins are each slidably received within a respective one of the pair of slots.

14. The imaging system of claim 1, wherein the control panel comprises a cavity configured to accommodate the display panel therein.

15. The imaging system of claim 14, wherein the second arm is positioned between the first arm and a base of the cavity when the display panel is provided in a stowed position in which the display panel lies substantially flat within the cavity.

16. The imaging system of claim 1, further comprising a main display separate from the touch-sensitive display.

17. The imaging system of claim 16, wherein the main display is movably coupled to the control panel via an articulating arm.

18. The imaging system of claim 16, wherein the main display is provided in an integrated housing with the control panel to form a portable imaging system.

19. The imaging system of claim 18, wherein the main display is provided in a first housing portion of the ultrasound imaging system and the control panel is provided in a second housing portion of the ultrasound imaging system that is hinged to the first housing portion.

20. The imaging system of claim 1, wherein the imaging system is an ultrasound imaging system configured to generate ultrasound images from ultrasound echoes acquired by a transducer array.

* * * * *